US009635148B2

(12) United States Patent
Tewari et al.

(10) Patent No.: US 9,635,148 B2
(45) Date of Patent: Apr. 25, 2017

(54) PARTITIONING DATA SETS FOR TRANSMISSION ON MULTIPLE PHYSICAL LINKS

(71) Applicant: Aruba Networks, Inc., Sunnyvale, CA (US)

(72) Inventors: Claudius Tewari, San Jose, CA (US); Gopalakrishnan Raman, San Jose, CA (US); Rajesh Mirukula, San Jose, CA (US); Sathish Damodaran, San Jose, CA (US); Berend Dunsbergen, San Jose, CA (US); Jie Jiang, San Jose, CA (US); Mohd Siraj, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 110 days.

(21) Appl. No.: 14/530,451

(22) Filed: Oct. 31, 2014

(65) Prior Publication Data

US 2016/0127520 A1    May 5, 2016

(51) Int. Cl.
*H01L 29/06*   (2006.01)
*H04L 29/06*   (2006.01)
*H04L 12/46*   (2006.01)
*H04L 29/08*   (2006.01)
(Continued)

(52) U.S. Cl.
CPC .......... *H04L 69/22* (2013.01); *H04L 12/4633* (2013.01); *H04L 69/321* (2013.01); *H04L 69/323* (2013.01); *H04W 28/08* (2013.01); *H04W 88/08* (2013.01)

(58) Field of Classification Search
CPC ... H04L 69/22; H04L 12/4633; H04L 69/321; H04L 69/323; H04L 12/2856; H04L 12/2894; H04L 69/14; H04L 45/24; H04L 45/00; H04L 69/16; H04L 29/06; H04L 49/30; H04L 63/20; H04L 45/74; H04L 45/38; H04L 45/7457; H04W 88/08; H04W 36/02; H04W 36/385
See application file for complete search history.

(56) References Cited

U.S. PATENT DOCUMENTS 7,505,472 B1 *  3/2009  Becker Hof .......... H04L 12/413
                                                    370/401
7,643,519 B2 *  1/2010  Devereux .............. H04L 12/66
                                                    370/229

(Continued)

*Primary Examiner* — Brian O'Connor
(74) *Attorney, Agent, or Firm* — Brooks, Cameron & Huebsch, PLLC

(57) ABSTRACT

The present disclosure discloses a method and a network device for partitioning data sets for transmission on multiple physical links in a network. Specifically, a network device receives a particular data set addressed to a client device. The network device partitions the particular data set into at least a first subset of data and a second subset of data. Then, the network device encapsulates the first subset of data using a first header and encapsulating the second subset of data using a second header that results in (a) data with the first header being transmitted on a first physical link and (b) data with the second header being transmitted on a second physical link different than the first physical link. Finally, the network device transmits the first subset of data with the first header and the second subset of data with the second header.

20 Claims, 9 Drawing Sheets

(51) Int. Cl.
*H04W 88/08* (2009.01)
*H04W 28/08* (2009.01)

(56) References Cited

U.S. PATENT DOCUMENTS

| | | | | |
|---|---|---|---|---|
| 8,135,006 | B2* | 3/2012 | Walter | H04L 12/2856 370/389 |
| 8,284,789 | B2* | 10/2012 | Soon | H04L 45/00 370/412 |
| 8,588,061 | B2* | 11/2013 | Pan | H04L 45/00 370/229 |
| 8,619,560 | B1* | 12/2013 | Binns | H04L 67/322 370/229 |
| 8,718,064 | B2* | 5/2014 | Beliveau | H04L 67/327 370/392 |
| 9,036,476 | B2* | 5/2015 | Grandhi | H04L 47/52 370/235 |
| 9,078,137 | B1* | 7/2015 | Chechani | H04W 12/08 |
| 9,398,118 | B2* | 7/2016 | Alsup | H04L 12/40156 |
| 9,456,378 | B2* | 9/2016 | Zhu | H04W 28/0268 |
| 2007/0268918 | A1* | 11/2007 | Gopi | H04L 12/4633 370/401 |
| 2010/0091660 | A1* | 4/2010 | Morita | H04L 12/5695 370/241 |
| 2011/0078285 | A1* | 3/2011 | Hawkins | G06F 17/3089 709/219 |
| 2013/0064198 | A1* | 3/2013 | Krishnaswamy | H04W 76/025 370/329 |
| 2015/0181459 | A1* | 6/2015 | Zhu | H04W 28/0268 370/236 |
| 2015/0215784 | A1* | 7/2015 | Gunasekara | H04L 47/00 455/411 |

* cited by examiner

PARTITIONING DATA SETS FOR TRANSMISSION ON MULTIPLE PHYSICAL LINKS

FIELD

Embodiments of the present disclosure relate to throughput optimization over multiple physical links by network devices. In particular, embodiments of the present disclosure describe a method and network device for partitioning data sets from a single flow for transmission on multiple physical links.

BACKGROUND

Next generation IEEE 802.11 ac wireless access points (APs) are capable of wireless local area network (WLAN) Physical Layer (PHY) throughput at greater than 1.7 Gbps. Specifically, an AP's single WLAN radio is capable to transmitting or receiving up to 1.7 Gbps of PHY data from a single wireless client device associated to the AP's WLAN interface. In fact, this entire WLAN data rate can be associated with a single flow between the wireless client device and a wired server. However, because typical wired Ethernet link speeds on the APs are only 1 Gbps, an AP would need at least two wired uplinks to support a wireless throughput of 1.7 Gbps.

Moreover, even with two gigabyte-Ethernet (GigE) links, supporting a wireless throughput of 1.7 Gbps for a single flow still presents problems. First, if packets of a single high bandwidth flow are transmitted on the two separate GigE links, it is possible for the packets to arrive out of order by the time they reach the destination. Some industry standards, e.g., IEEE 802.11i, require an AP to send the packets as ordered by their sequence number to the wireless client device. If packets arrive out of order, the client device will drop the packet. If a threshold number of out-of-order packets have been received, the client device may consider itself under active security attack and take additional steps to refuse receiving further communications from the AP. The second problem is that Ethernet link aggregation (LAG) schemes commonly send packets of a single flow on the same physical link to preserve link affinity, thereby limiting the wireless throughput for a single flow to no more than 1 Gbps.

DETAILED DESCRIPTION

In the following description, several specific details are presented to provide a thorough understanding. While the context of the disclosure is directed to network throughput optimization by network devices, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network throughput optimization by network devices. In particular, embodiments of the present disclosure describe a method and network device for partitioning data sets for transmission on multiple physical links.

With the solution provided herein, a network device receives a particular data set addressed to a client device. The network device partitions the particular data set into at least a first subset of data and a second subset of data. Then, the network device encapsulates the first subset of data using a first header and encapsulating the second subset of data using a second header that results in (a) data with the first header being transmitted on a first physical link and (b) data with the second header being transmitted on a second physical link different than the first physical link. Finally, the network device transmits the first subset of data with the first header and the second subset of data with the second header.

Moreover, according to some embodiments, the network device can receive a particular data set addressed to a client device. The network device then partition the particular data set into a plurality of data sets. Moreover, the network device encapsulates each of the plurality of data sets with a unique sequence number, and transmits the encapsulated plurality of data sets. Furthermore, an access point can receive the encapsulated plurality of data sets using at least two physical links, and wirelessly transmits to the client device the encapsulated plurality of data sets in the order of the sequence numbers added by the first network device.

In addition, an access point according to embodiments of the present disclosure can receive a plurality of encapsulated data sets on a wired interface. Each of the plurality of encapsulated data sets includes a sequence number. Also, the access point orders the plurality of encapsulated data sets according to the corresponding sequence number for each respective data set, and transmits the plurality of encapsulated data sets according to the order determined by the access point based on the corresponding sequence numbers.

Network Computing Environment

A. Physical Architecture

Figure 1:
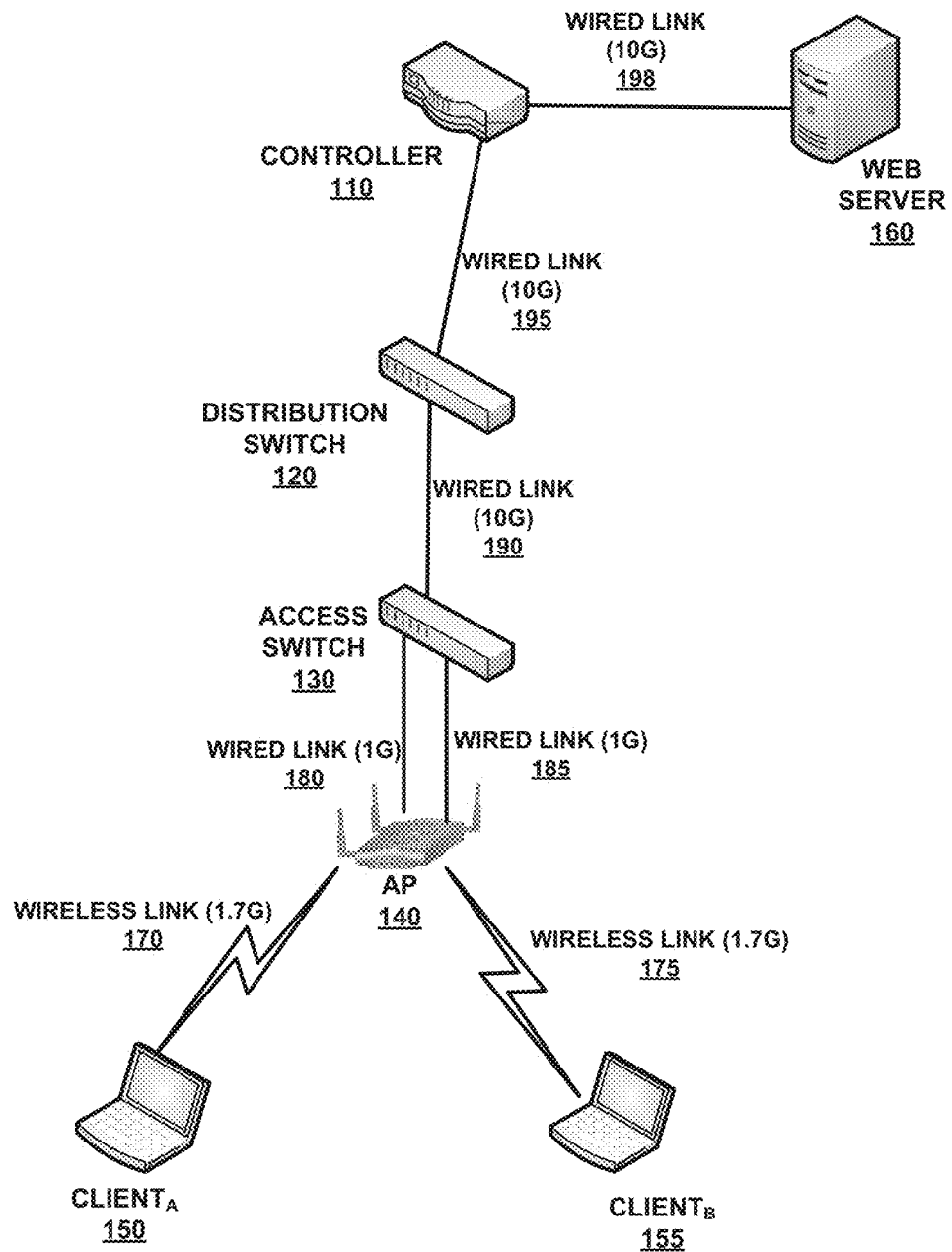
FIG. 1 shows an exemplary network environment according to embodiments of the present disclosure.

FIG. 1 shows an exemplary network environment according to embodiments of the present disclosure. Specifically, FIG. 1 illustrates a network that includes at least a web server 160, a network controller 110, a distribution switch 120, an access switch 130, an access point (AP) 140, and a plurality of client devices, such as $Client_A$ 150 and $Client_B$ 155.

Web server 160 generally refers to a network computer system that processes requests via Hypertext Transfer Protocol (HTTP). In addition to hosting websites, web server 160 can also be used for gaming, data storage, running enterprise applications, handling email, file transfer protocol (FTP), or other web services. In general, a service is an abstraction of web resources. A client device can be agnostic of how the server performs while fulfilling the request and delivering the response. The client device only needs to understand the response based on a mutually agreed application protocol, e.g., HTTP, FTP, etc. Web server 160 may be connected to network controller 110 via Internet. Alternatively, web server 160 may be a part of the same wired and/or wireless local area network that network controller 110 belongs to.

Network controller 110 generally refers to a controlling device that manages other network devices such as wireless access points. Network controller 110 may handle automatic adjustments to radio frequency power, wireless channels, wireless authentication, and/or security, and deliver essential mobility services such as AppRF technology for OSI Layer 4-7 application control, multicast Domain Name System (DNS) optimization, IP roaming, and Security Assertion Markup Language (SAML) integration based on user roles, devices, applications and location. Furthermore, network controller 110 can be combined to form a wireless mobility group to allow inter-controller roaming. In some embodiments, network controller 110 can centralize IP services and policy control across wired and wireless as well as simplify the integration of network security and third-party enterprise application platforms.

A network switch, such as distribution switch 120 or access switch 130, refers generally a computer networking device that is used to connect devices together on a computer network, by using a form of packet switching to forward data to the destination device. In some embodiments, a network switch can be a multi-port network bridge that processes and forwards data at the data link layer (layer 2) of the OSI model. In some embodiments, switches can incorporate Layer-3 routing functions in addition to bridging.

Access points, e.g., $AP_A$ 140, generally refer to a set of wireless network devices that allow wireless client devices to connect to a wired network using IEEE 802.11 or related standards. The APs usually connect to a router via a wired network, but can also be an integral component of the router itself. AP 140 serves one or more client devices. For illustration purposes only, assuming that, in FIG. 1, a set of client devices including $Client_A$ 150 and $Client_B$ 155 are associated with AP 140.

Link aggregation generally refers to a technique for combining multiple network connections in parallel in order to increase throughput beyond what a single connection could sustain, and to provide redundancy in case one of the links should fail. It is often used in a high-speed-backbone network to enable the fast transmission of bulk data. Within the IEEE specification the Link Aggregation Control Protocol (LACP) provides a method to control the bundling of several physical ports together to form a single logical channel. Specifically, LACP allows a network device to negotiate an automatic bundling of links by sending LACP packets to the peer, which is a directly connected device that also implements LACP.

Conventionally, a link aggregation group (LAG) adopts a flow affinity mechanism to ensure that packets from the same flow, or corresponding to the same three- or five-tuple, will always be transmitted on the same physical link to prevent the packets from being received out of order. The tuple for a flow usually comprises the protocol, along with source address and destination address, and optionally, source and destination ports. Therefore, data packets from a single flow will be transmitted on the same 1 Gbps link (e.g., wired link 180 or 185) from access switch 130 to AP 140. As a result, the maximum throughput that AP 140 can transmit data packets from a single flow to a client device (e.g., $Client_A$ 150) will be 1 Gbps, even though the maximum wireless throughput is 1.7 Gbps.

B. Logical Structure

When an access controller (e.g., network controller 110) is present in a wireless local area network (WLAN) system, one mode of operation is to send all WLAN client data packets between network controller 110 and AP 140 on one or more logical tunnels. Each tunnel is associated with a unique IP address. For example, $tunnel_1$ is associated with $IP_1$; and, $tunnel_2$ is associated with $IP_2$.

When network controller 110 receives a Transmission Control Protocol (TCP) data packet, prior to sending the packet via a tunnel, network controller 110 encapsulates the TCP data packet with an outer header. The outer header may be an IPv4 and/or IPv6 header. In addition, the outer header may include a transport header, such as a Generic Routing Encapsulation (GRE) header. The destination IP in the outer header is set to either the IP address of network controller 110 (for packets received from a wireless station, e.g., $Client_A$ 150), or the IP address of AP 140 (for packets destined to a wireless station, e.g., $Client_A$ 150).

To avoid being affected by LAG's flow affinity mechanism, embodiments of the present disclosure use at least two different encapsulation headers on the data packets from a single flow. For example, one header is applied to a first portion of the TCP data packets in the flow, and another header is applied to the remaining TCP data packets in the same flow. The at least two encapsulation headers differ in one or more fields, which can be, e.g., source IP address and/or destination IP address. This allows intermediate network devices (e.g., distribution switch 120 and access switch 130) that have multiple links in a LAG to send packets of the flow over multiple links in the LAG rather than a single link in the LAG. Therefore, techniques according to embodiments of the present disclosure overcome LAG's limitation of having to use a single GigE link for transmitting all packets in the same flow, which results in the wireless throughput not being optimized in the network.

TCP Data Packet Encapsulation

Figure 2:
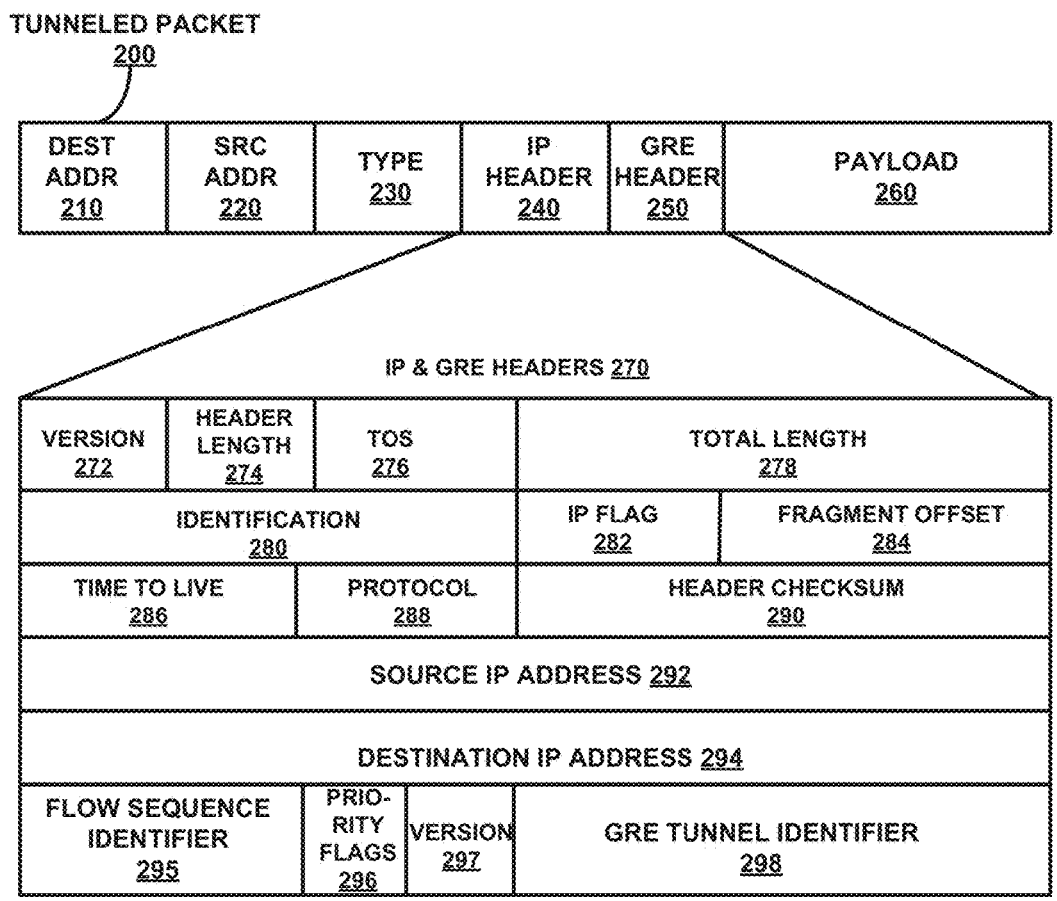
FIG. 2 shows a diagram illustrating an exemplary tunneled network packet according to embodiments of the present disclosure.

FIG. 2 illustrates an exemplary tunneled packet according to embodiments of the present disclosure. Specifically, a tunneled packet 200 in FIG. 2 includes at least a destination address 210, a source address 220, a type 230, an IP header 240, a GRE header 250, and a payload 260. The portion representing the combination of IP and GRE headers 270 further includes a version 272, a header length 274, a type of service (TOS) 276, a total length 278, an identification 280, a few IP flags 282, a fragment offset 284, a time to live (TTL) 286, a protocol 288, a header checksum 290, a source IP address 292, a destination IP address 294, a flow sequence identifier 295, a few priority flags 296, a version 297, and a GRE tunnel identifier 298, etc. Note that, IETF RFC 791 describes complete Internet Protocol (IP) specification, and IETF RFC 793 describes complete Transmission Control Protocol (TCP) specification, both of which are herein incorporated by reference in the entirety.

To avoid being affected by LAG's flow affinity mechanism, embodiments of the present disclosure use at least two different encapsulation headers on the data packets from a single flow. For example, a first encapsulation header may include a first IP header that corresponding to a source IP address of $IP_1$, and a GRE header. Moreover, a second encapsulation header may include a second IP header that corresponding to a source IP address of $IP_2$ and the same GRE header. In one embodiment, the odd number of packets (hereinafter "white packet") are encapsulated using the first encapsulation header, and the even number of packets (hereinafter "shaded packet") are encapsulated using the second encapsulation header. Hence, the white packets will be transmitted via $tunnel_1$ and the shaded packets will be transmitted via $tunnel_2$.

Note that, although only a variation in the source IP address is described in the encapsulation mechanism above, any variation in any parameter of the three- or five-tuple can be used in the encapsulation mechanism. Moreover, layer-2 headers, such as different source MAC addresses and/or destination MAC addresses can also be used during encapsulation in lieu of the source IP address without departing from the spirit of the present disclosure. It is important to note that the at least two encapsulation headers must differ in at least one field, which can be, e.g., source IP address, destination IP address, source port identifier, destination port identifier, etc.

Note also that, although the above described example encapsulates odd number of packets with white packet header and even number of packets with shaded packet header, a data encapsulation mechanism according to embodiments of the present disclosure can encapsulate data packets using two or more of different headers in any combination. Nevertheless, one of the goals of encapsulating data packets with different headers is to keep a relative balance of packet load among the number of packets associated with each header. For example, if a network controller encapsulate a large-size packet with a first type of header, then when the network controller receives the next large-size packet, the network controller will encapsulate the next packet with a second type of header. It is undesirable to have one link overloaded with data packets during transmission such that it causes packet loss, whereas at the same time, another link is under-utilized and can be used to mitigate the overloading problem. Because the network controller has the knowledge of all encapsulated packets transmitted on each tunnel in case of concurrent transmission of multiple flows, the size of each encapsulated packet, and the specific downlink that the packet will be transmitted on, the network controller can intelligently balance the load on each downlink by adjusting the encapsulation scheme.

In some embodiments, a network controller can keep an instantaneous measure of transmission rate for each link, taking account of both the total number of packets transmitted as well as the total size of the transmission. The network controller will encapsulate the data packets such that the data loads on the multiple links are balanced. In some embodiments, a network controller can maintain a counter that tracks the total number of "white packets" and "shaded packets" sent within a predetermined period of time. In some embodiments, the counter tracks the total number of bytes sent as "white packets" and the total number of bytes sent as "shaded packets" within a predetermined period of time.

In some embodiments, the encapsulation mechanism can further utilize the generalized processor sharing (GPS) algorithm or its approximations. GPS generally refers to a scheduling algorithm that aims to achieve perfect fairness. Generalized processor sharing assumes that network traffic has infinitesimal packet sizes and can be arbitrarily split. Approximations of GPS algorithm include weighted fair queuing (WFQ), packet-by-packet generalized processor sharing (PGPS), etc.

In some embodiments, the encapsulation mechanism can utilize a deficit round robin (DRR) algorithm. Specifically, DRR generally refers to a network scheduling algorithm that can handle packets of variable size without knowing their mean size. A maximum packet size number is subtracted from the packet length, and packets that exceed that number are held back until the next visit of the scheduler. DRR serves packets at the head of every non-empty queue whose deficit counter is greater than the packet's size at the head of the queue. If the deficit counter is lower, then the queue is skipped and its credit is increased by some given value called quantum. This increased value is used to calculate the deficit counter the next time around when the scheduler examines this queue for serving its head-of-line packet. If the queue is served, then the credit is decremented by the size of packet being served. DRR has the advantage of scheduling is that it does not require knowledge of the size of the incoming packets on the different links. Note that, although only two link scheduling algorithms are described here, any link scheduling algorithm can be used by the encapsulation mechanism without departing from the spirit of the present disclosure.

Moreover, the difference in the at least two encapsulation headers will cause the LAG to transmit the packets on at least two different physical links. Typically, an LAG uses an XOR operation to distribute the packets across multiple physical links. Therefore, a network controller according to embodiments of the present disclosure can deliberately use M as the first source IP address in the first encapsulated header, and M+1 (or M−1) as the second source IP address in the second encapsulated header. Accordingly, the XOR operation will result in packets with the first encapsulated header being transmitted on a first physical link, and packets with the second encapsulated header being transmitted on a second and different physical link.

The above-mentioned encapsulation mechanism allows intermediate network devices (e.g., distribution switch 120 and access switch 130) that have multiple links in a LAG to send packets of a single flow over multiple physical links in the LAG rather than the same physical link in the LAG. Therefore, techniques according to embodiments of the present disclosure overcome LAG's limitation of having to use a single GigE link for transmitting all packets in the same flow, which leads to the wireless throughput not being optimized in the network.

Furthermore, a unique flow sequence identifier is added in the outer encapsulation header (e.g., the GRE header) of each data packet prior to transmitting the packets to their destinations via the tunnels. The unique sequence identifier is utilized by the receiver (e.g., the AP for downstream packets or the network controller for upstream packets) to detect data packets that are received from the tunnels out of order. The receiver can then re-order the received data packets based on the order of the unique sequence identifier retrieved from the outer header of each packet.

Downstream Transmission Scheme

Figure 3:
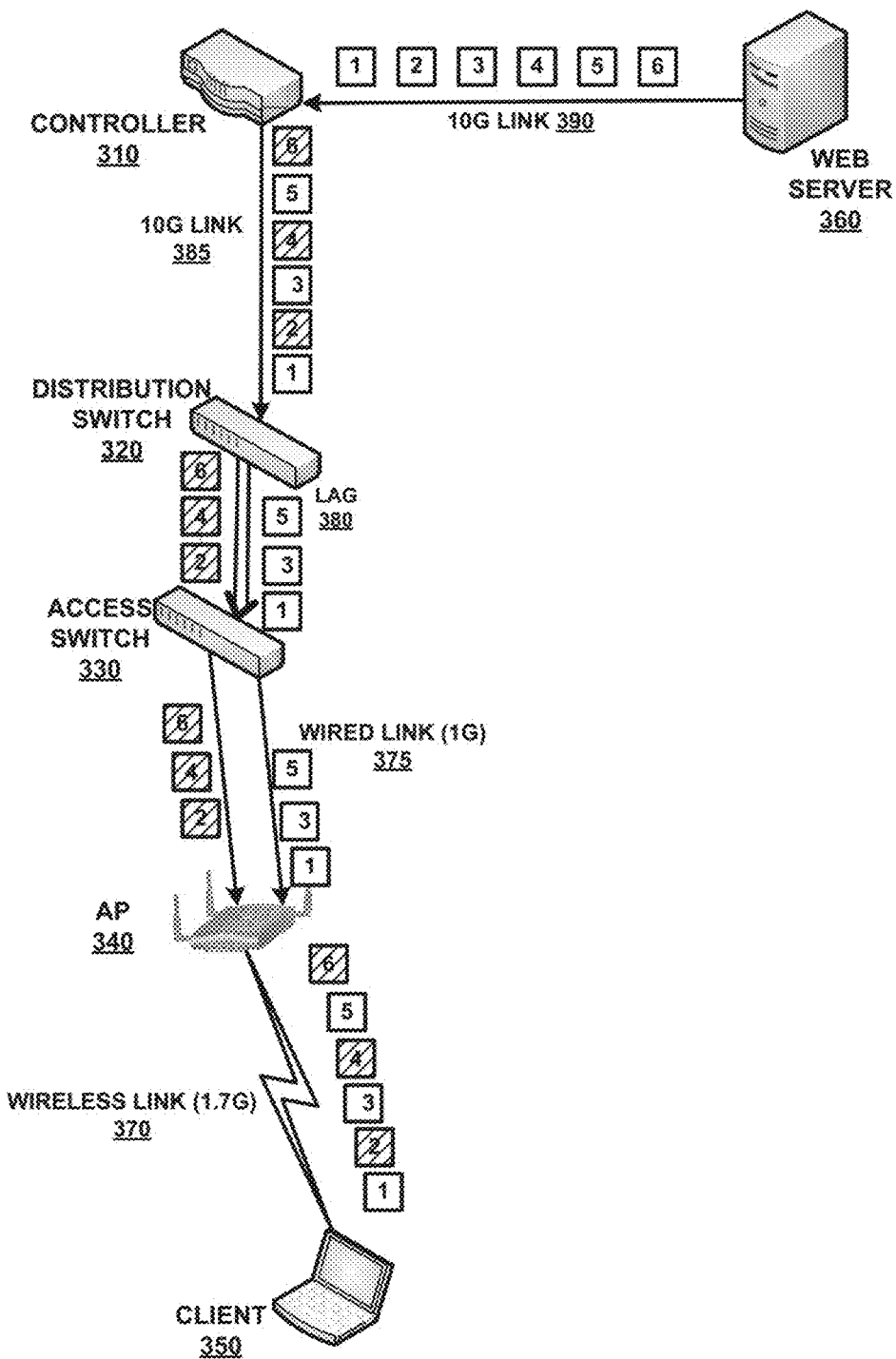
FIG. 3 shows a diagram illustrating an exemplary downlink transmission scheme according to embodiments of the present disclosure.

FIG. 3 illustrates an exemplary downstream transmission scheme according to embodiments of the present disclosure. Specifically, FIG. 3 includes at least a web server 360, a network controller 310, a distribution switch 320, an access switch 330, an AP 340, and a wireless client device 350. Network controller 310 has 10 Gbps link 390 that connects to a data center (e.g., web server 360). Moreover, network controller 310 is connected to distribution switch 320 with a 10G wired link 385, and distribution switch 320 is connected to access switch 330 with a 10G wired link 380. Moreover, AP 340 is connected to access switch 330 via multiple physical links, each link may only have a limited throughput, e.g., 1 Gbps wired links 375. On the other hand, multiple client devices (e.g., client device 350) maybe connected to AP 340 via wireless links (e.g., 1.7 Gbps wireless link 370). Because the maximum throughput of the wireless link between client device 350 and AP 340 is higher than the maximum throughput of AP 340's uplink (e.g., 1 Gbps wired link 375), AP 340 will need to use more than one uplink ports in order to reach the maximum wireless throughput of 1.7 Gbps.

For illustration purposes only, assuming that a network controller 310 will transmit to client device 350 a plurality of data packets from a single flow, including, $packet_1$, $packet_2$, $packet_3$, $packet_4$, $packet_5$, $packet_6$, etc. Note that, a client device can initiate multiple flows of data transmission. However, a single flow of data transmission must be terminated at a single client device. The mechanism disclosed herein can also be used for transmissions of multiple flow sessions.

After network controller 310 receives the plurality of data packets, network device 310 encapsulates the plurality of data packets with two different headers, and thus logically split the plurality of data packets into two categories, namely, the white packets (e.g., $packet_1$, $packet_3$, $packet_5$, etc.) and the shaded packets (e.g., $packet_2$, $packet_4$, $packet_6$, etc.). Details of the packet encapsulation are described below in reference to FIGS. 4A-4B. Next, network controller 310 transmits the encapsulated packets to distribution switch 320 via 10 Gbps wired link 385. Then, distribution switch 320 transmits the plurality of data packets, including both the white packets and the shaded packets, to access switch 330 via link aggregation group (LAG) 380. Next, access switch 330 transmit, to AP 340, the white packets on one 1 Gbps wired physical link and the shaded packets on another 1 Gbps wired physical link 375.

Thereafter, packets need to be reordered by AP 340 because packets of the flow that traverse different links can be associated with different delays in transmission time. Thus, the packets from the single flow transmitted with the above-described encapsulation mechanism may arrive at AP 340 out of order. To solve this problem, embodiments of the present disclosure add a unique flow sequence identifier in the outer encapsulation header prior to transmitting the packets through the tunnels. The receiver (e.g., AP 340 for downstream transmission) can then detect the out-of-order data packets as AP 340 receives them, and re-order the data packets based on their unique sequence identifiers. Finally, the reordered data packets will be transmitted to client device 350 via wireless link 370, which supports up to 1.7 Gbps throughput.

Figures 4A, 4B:
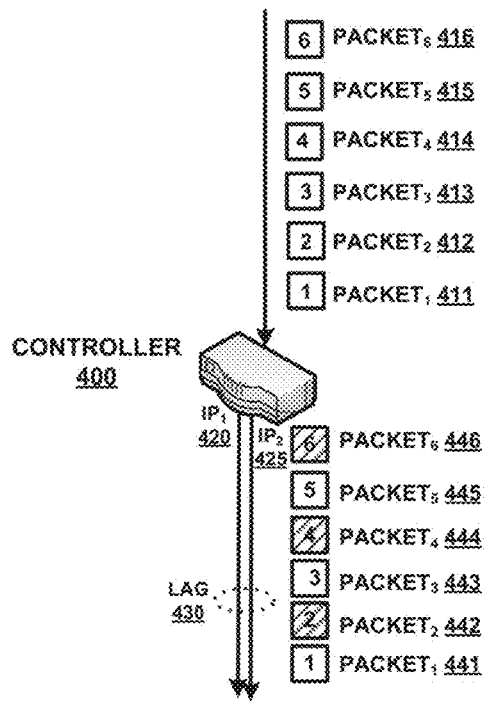
FIGS. 4A-4B show diagrams illustrating exemplary partitioning of data sets for transmission on multiple physical links according to embodiments of the present disclosure.

FIGS. 4A-4B show diagrams illustrating exemplary partitioning of data sets for transmission on multiple physical links according to embodiments of the present disclosure. Specifically, in FIG. 4A, network controller 400 receives incoming packets, such as, $packet_1$ 411, $packet_2$ 412, $packet_3$ 413, $packet_4$ 414, $packet_5$ 415, $packet_6$ 416, etc. The incoming packets are destined to the same client device and belong to a particular single flow. Moreover, network controller 400 has no knowledge of the total number of incoming packets in the particular single flow before network controller 400 schedules the packets for downstream transmissions. Moreover, network controller 400 has at least two IP addresses, namely, $IP_1$ 420 and $IP_2$ 425.

Upon receiving each data packet, network controller 400 encapsulate the packet into either $packet\ type_1$ 480 or $packet\ type_2$ 485 as illustrated in FIG. 4B. Specifically, $packet\ type_1$ 480 (e.g., $packet_1$ 411, $packet_3$ 413, $packet_5$ 415) includes at least an IP header 450 with $IP_1$ as the source IP address, a GRE header 460, and payload 470. By contrast, $packet\ type_2$ 485 (e.g., $packet_2$ 412, $packet_4$ 414, $packet_6$ 416) includes at least an IP header 455 with $IP_2$ as the source IP address, a GRE header 460, and payload 470. A first XOR operation on $IP_1$ 420 and the destination IP address results in packets with $packet\ type_1$ 480 being transmitted on a first link in LAG 430. Further, a second XOR operation on $IP_2$ 425 and the destination IP address results in packets with $packet\ type_2$ 485 being transmitted on a second link in LAG 430.

In some embodiments, one or more intermediary network devices connecting the network controller and the AP (e.g., L2/L3 switches) can further partition each type of packets into two or more subsets, whereas each subset of data packets is transmitted on a unique downlink by the intermediary network device.

In some embodiments, network controller 400 can keep an instantaneous measure of transmission rate for each link, taking account of both the total number of packets transmitted as well as the total size of the transmission. Network controller 400 will encapsulate the data packets such that the data loads on the multiple links are balanced. In some embodiments, network controller 400 can maintain a counter that tracks the total number of $type_1$ packets and $type_2$ packets sent within a predetermined period of time. In some embodiments, the counter tracks the total number of bytes sent as $type_1$ packets and the total number of bytes sent as $type_2$ packets within a predetermined period of time.

In some embodiments, network controller 400 can further utilize the generalized processor sharing (GPS) or similar algorithms to schedule the incoming packets to be transmitted on multiple downstream links. In some embodiments, the encapsulation mechanism can utilize a deficit round robin (DRR) algorithm to schedule the incoming packets to be transmitted on multiple downstream links.

Upstream Transmission Scheme

Figure 5:
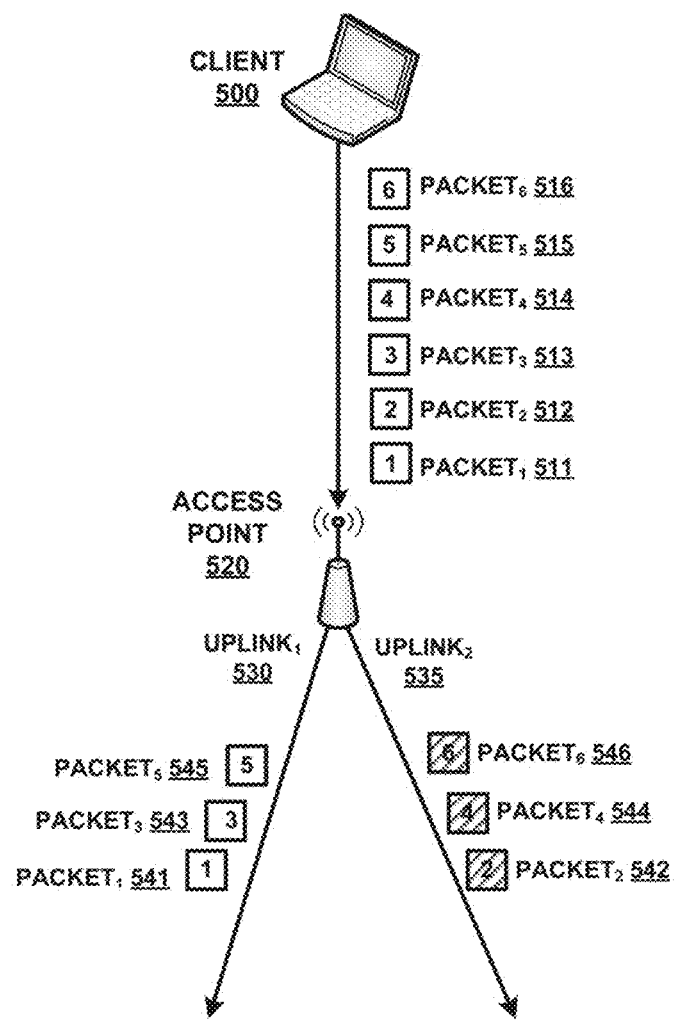
FIG. 5 shows a diagram illustrating an exemplary uplink transmission scheme according to embodiments of the present disclosure.

FIG. 5 shows a diagram illustrating an exemplary upstream transmission scheme according to embodiments of the present disclosure. Specifically, FIG. 5 includes at least a client device 500 and an access point (AP) 520. Specifically, client device 500 is connected to AP 520 via a high throughput wireless link. Furthermore, client device 500 transmits a plurality of data packets, including but not limited to, $packet_1$ 511, $packet_2$ 512, $packet_3$ 513, $packet_4$ 514, $packet_5$ 515, $packet_6$ 516, etc., to network via AP 520. Note that, the plurality of data packets belong to a single flow with the same destination address, source address, destination port number, source port number, and protocol. Moreover, like network controller in the downstream transmission scheme, AP 520 can encapsulate the outgoing packets with two or more different headers. For example, AP 520 can encapsulate $packet_1$ 511, $packet_3$ 513, and $packet_5$ 515 with a first header to generate encapsulated packets, such as, $packet_1$ 541, $packet_3$ 543, and $packet_5$ 545. Similarly, AP 520 can encapsulate $packet_2$ 512, $packet_4$ 514, and packet$_6$ 516 with a second header to generate encapsulated packets, such as, packet$_2$ 542, packet$_4$ 544, and packet$_6$ 546. Subsequently, AP 520 will transmit all packets with the first header (e.g., packet$_1$ 541, packet$_3$ 543, and packet$_5$ 545) on uplink$_1$ 530, and all packets with the second header (e.g., packet$_2$ 542, packet$_4$ 544, and packet$_6$ 546) on uplink$_2$ 535. Therefore, by allowing concurrent uplink transmission of data packets from a single flow on both uplink$_1$ 530 and uplink$_2$ 535, the technique disclosed herein greatly increases the throughput of the packet transmission.

Furthermore, a unique flow sequence identifier is added in the outer encapsulation header (e.g., the GRE header) of each data packet prior to transmitting the packets to their destinations via the tunnels. The unique sequence identifier is utilized by the receiver (e.g., an upstream high throughput network controller) to detect data packets that are received from the tunnels out of order. The receiver can then re-order the received data packets based on the order of the unique sequence identifier retrieved from the outer header of each packet.

Process for Partitioning Data Sets for Transmission on Multiple Physical Links

Figure 6:
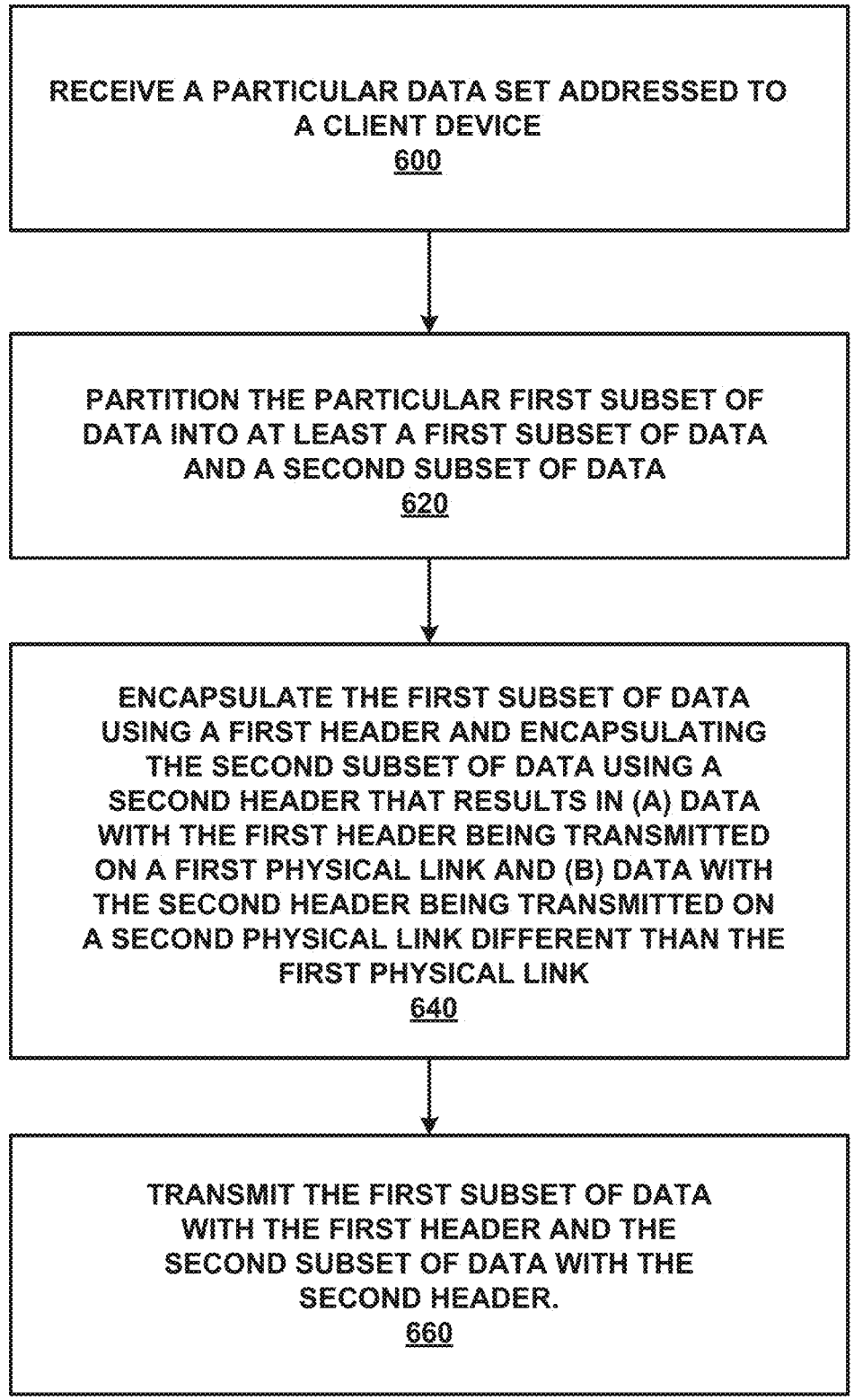
FIG. 6 illustrates an exemplary process for partitioning data sets for transmission on multiple physical links according to embodiments of the present disclosure.

FIG. 6 illustrates an exemplary process for partitioning data sets for transmission on multiple physical links according to embodiments of the present disclosure. During operations, a network device receives a particular data set addressed to a client device (operation 600). Moreover, the network device partitions the particular the particular data set into at least a first subset of data and a second subset of data (operation 620). Then, the network device encapsulates the first subset of data using a first header and encapsulating the second subset of data using a second header that results in (a) data with the first header being transmitted on a first physical link and (b) data with the second header being transmitted on a second physical link different than the first physical link (operation 640). Further, the network device transmits the first subset of data with the first header and the second subset of data with the second header (operation 660).

In some embodiments, a second network device different than a first network device selects the first physical link for the first subset of data based on the corresponding first header and selects the second physical link for the second subset of data based on the corresponding second header. In some embodiments, the first network device transmits data with the first header on the first physical link and data with the second header on the second physical link.

In some embodiments, a size of the first subset of data to be encapsulated with the first header and/or a size of the second subset of data to be encapsulated with the second header are based at least on a load expected on the first physical link and/or a load expected on the second physical link.

In some embodiments, a source IP address for the first header is different than a source IP address for the second header. Moreover, both the first IP address and the second IP address correspond to the first network device. In some embodiments, at least one value is different between a network tuple corresponding to the first subset of data and a network tuple corresponding to the second subset of data. Furthermore, the difference in the at least one value results in transmission of the first subset of data on the first physical link and the transmission of the second subset of data on the second physical link.

In some embodiments, the particular data set addressed to the client device may be associated with a single flow. In some embodiments, the particular data set addressed to the client device is associated with two or more flows.

Figure 7:
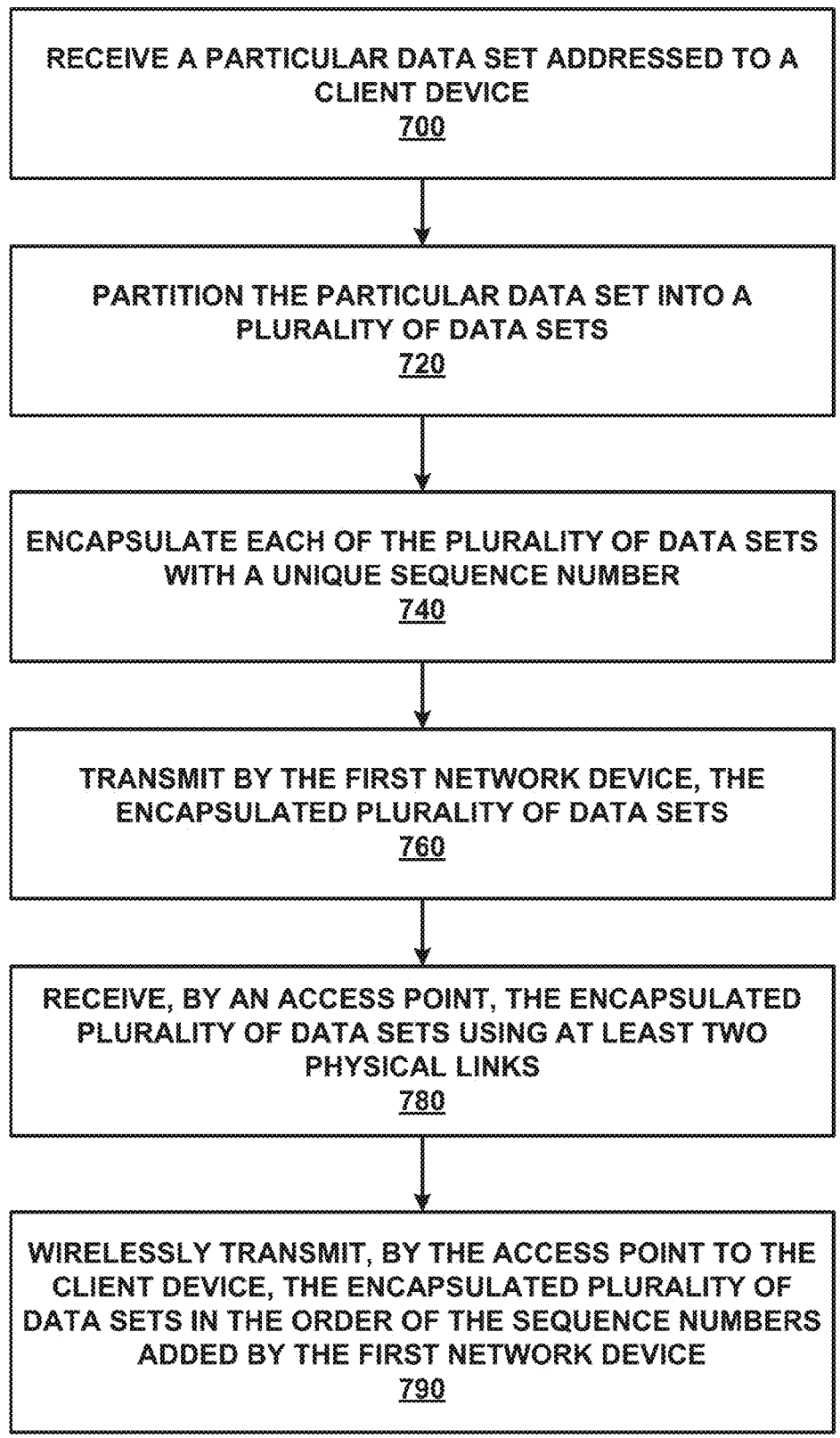
FIG. 7 illustrates another exemplary process for partitioning data sets for transmission on multiple physical links according to embodiments of the present disclosure.

FIG. 7 illustrates another exemplary process for partitioning data sets for transmission on multiple physical links according to embodiments of the present disclosure. During operations, a first network device receives a particular data set addressed to a client device (operation 700). The first network device then partitions the particular data set into a plurality of data sets (operation 720). Further, the first network device encapsulates each of the plurality of data sets with a unique sequence number (operation 740). Then, the first network device transmits the encapsulated plurality of data sets (operation 760). Subsequently, an access point receives the encapsulated plurality of data sets using at least two physical links (operation 780). Moreover, the access point wirelessly transmits, to the client device, the encapsulated plurality of data sets in the order of the sequence numbers added by the first network device (operation 790).

In some embodiments, the first network device encapsulates each of the plurality of data sets with a unique sequence number based at least in part on a second set of sequence numbers associated the particular data set prior to receipt by the first network device. For example, the unique sequence number for each packet may be a PN sequence number specified in the outer header of the packet in accordance to IEEE 802.11i standard. The second set of sequence numbers may be specified as a sequence number in the inner header of the packet, which is in an encrypted form.

Figure 8:
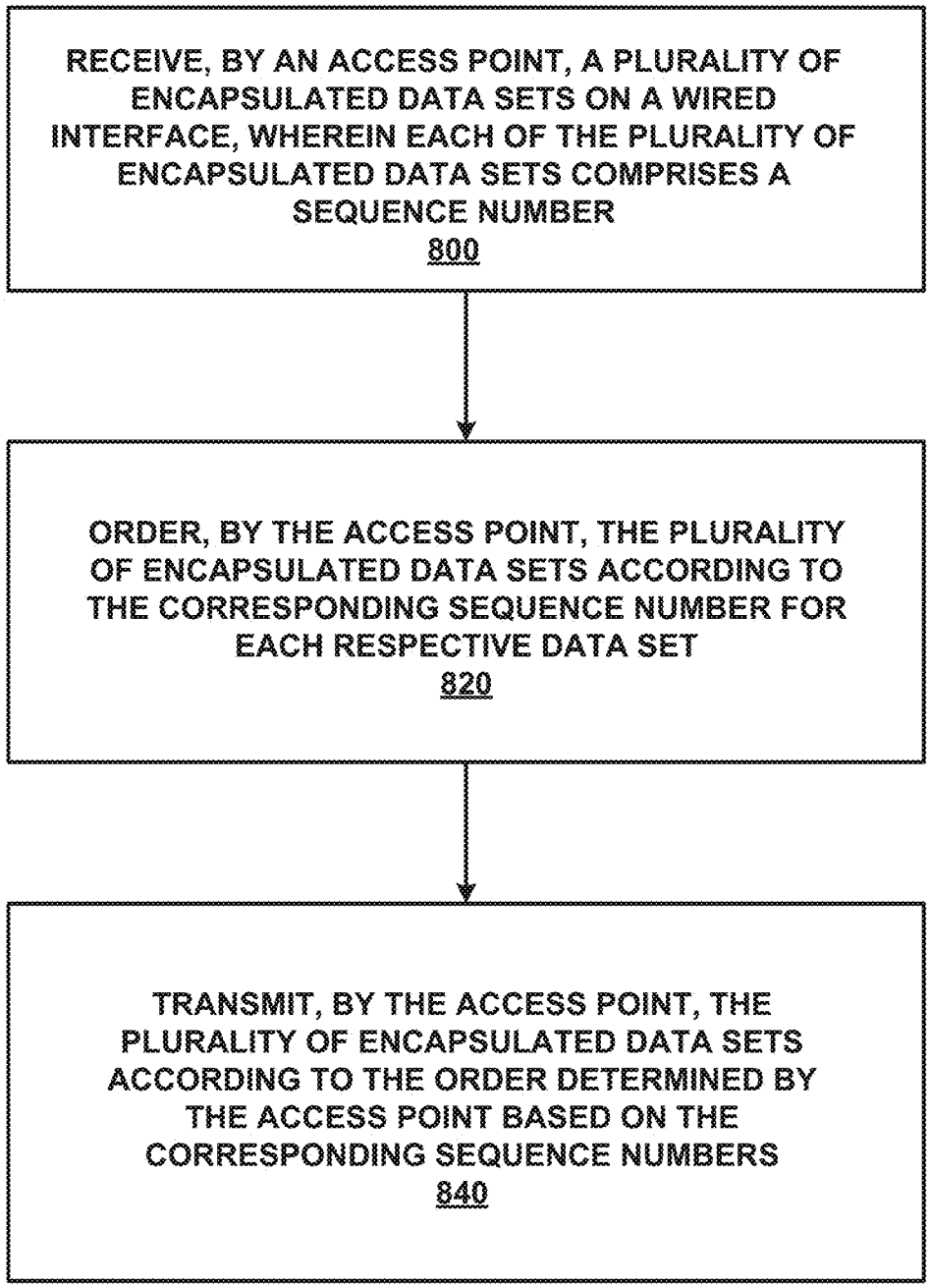
FIG. 8 illustrates another exemplary process for partitioning data sets for transmission on multiple physical links according to embodiments of the present disclosure.

FIG. 8 illustrates another exemplary process for partitioning data sets for transmission on multiple physical links according to embodiments of the present disclosure. During operations, an access point receives a plurality of encapsulated data sets on a wired interface (operation 800). Note that, each of the plurality of encapsulated data sets comprises a sequence number. Next, the access point orders the plurality of encapsulated data sets according to the corresponding sequence number for each respective data set (operation 820). Furthermore, the access point transmits the plurality of encapsulated data sets according to the order determined by the access point based on the corresponding sequence numbers (operation 840).

System for Partitioning Data Sets for Transmission on Multiple Physical Links

Figure 9:
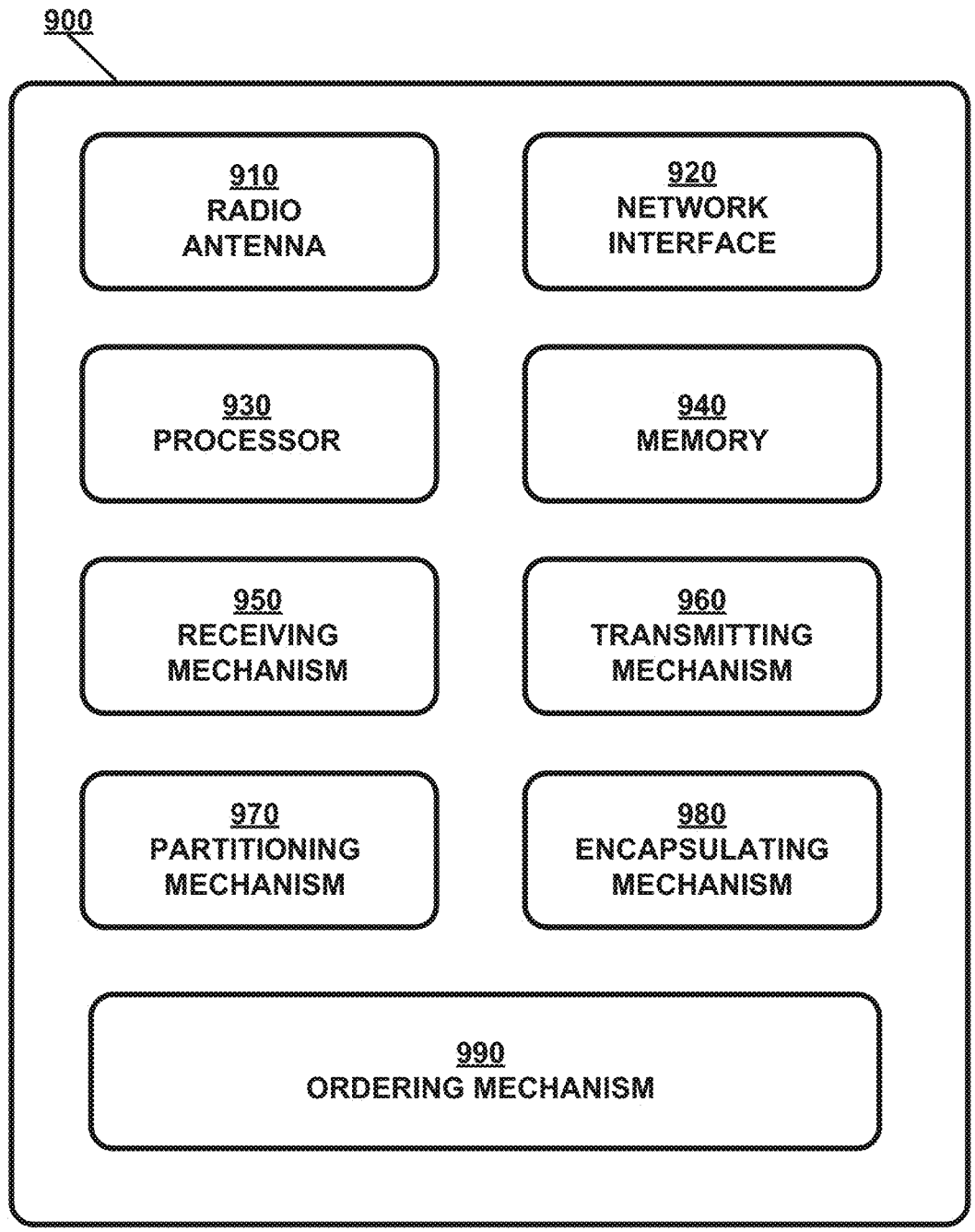
FIG. 9 is a block diagram illustrating an exemplary system for partitioning data sets for transmission on multiple physical links according to embodiments of the present disclosure.

FIG. 9 is a block diagram illustrating an exemplary system for partitioning data sets for transmission on multiple physical links according to embodiments of the present disclosure. Network device 900 includes at least one or more radio antennas 910 capable of either transmitting or receiving radio signals or both, a network interface 920 capable of communicating to a wired or wireless network, a processor 930 capable of processing computing instructions, and a memory 940 capable of storing instructions and data. Moreover, network device 900 further includes a receiving mechanism 950, a transmitting mechanism 960, a partitioning mechanism 970, an encapsulating mechanism 980, and an ordering mechanism 990, all of which are in communication with processor 930 and/or memory 940 in network device 900. Network device 900 may be used as a client system, or a server system, or may serve both as a client and a server in a distributed or a cloud computing environment.

Radio antenna 910 may be any combination of known or conventional electrical components for receipt of signaling, including but not limited to, transistors, capacitors, resistors, multiplexers, wiring, registers, diodes or any other electrical components known or later become known.

Network interface 920 can be any communication interface, which includes but is not limited to, a modem, token ring interface, Ethernet interface, wireless IEEE 802.11 interface, cellular wireless interface, satellite transmission interface, or any other interface for coupling network devices.

Processor 930 can include one or more microprocessors and/or network processors. Memory 940 can include storage components, such as, Dynamic Random Access Memory (DRAM), Static Random Access Memory (SRAM), etc.

Receiving mechanism 950 generally receives one or more network messages via network interface 920 or radio antenna 910 from a wireless client. The received network messages may include, but are not limited to, requests and/or responses, beacon frames, management frames, control path frames, and so on. Specifically, receiving mechanism 950 can receive a particular data set addressed to a client device. In some embodiments, the particular data set addressed to the client device is associated with a single flow. In some embodiments, the particular data set addressed to the client device is associated with two or more flows.

In some embodiments, receiving mechanism 950 can receive a plurality of encapsulated data sets on a wired interface using at least two physical links. Each of the encapsulated data sets may include at least a sequence number;

Transmitting mechanism 960 generally transmits messages, which include, but are not limited to, requests and/or responses, beacon frames, management frames, control path frames, and so on. Specifically, transmitting mechanism 960 can transmit a first subset of data with a first header and a second subset of data with a second header. In some embodiments, transmitting mechanism 960 transmits the first subset of data on the first physical link and the second subset of data on the second physical link. In some embodiments, transmitting mechanism 960 selects the first physical link for transmitting the first subset of data based on the corresponding first header, and selects the second physical link for transmitting the second subset of data based on the corresponding second header.

In some embodiments, transmitting mechanism 960 can wirelessly transmit, to a client device, a plurality of encapsulated data sets in the order of the sequence numbers ordered by ordering mechanism 990.

Partitioning mechanism 970 generally partitions a data set into a plurality of data sets. Specifically, partitioning mechanism 970 can partition the particular data set into at least a first subset of data and a second subset of data.

Encapsulating mechanism 980 generally encapsulates a packet within a particular type of header. Specifically, encapsulating mechanism 980 can encapsulate the first subset of data using a first header and encapsulate the second subset of data using a second header that results in (a) data with the first header being transmitted on a first physical link and (b) data with the second header being transmitted on a second physical link different than the first physical link. Moreover, a size of the first subset of data to be encapsulated with the first header and/or a size of the second subset of data to be encapsulated with the second header are based at least on a load expected on the first physical link and/or a load expected on the second physical link.

In some embodiments, a source IP address for the first header is different than a source IP address for the second header. Both the first IP address and the second IP address correspond to network device 900. In some embodiments, at least one value is different between a network tuple corresponding to the first subset of data and a network tuple corresponding to the second subset of data, and the difference in the at least one value results in transmission of the first subset of data on the first physical link and the transmission of the second subset of data on the second physical link.

In some embodiments, encapsulating mechanism 980 encapsulates each of the plurality of data sets with a unique sequence number. In particular, encapsulating mechanism 980 may encapsulate each of the plurality of data sets with a unique sequence number based at least in part on a second set of sequence numbers associated the particular data set prior to receipt by the first network device.

Ordering mechanism 990 generally re-orders incoming packets from a single flow that are received out-of-order from two or more physical links. Specifically, ordering mechanism 990 can order the plurality of encapsulated data sets according to the corresponding sequence number for each respective data set.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by one or more hardware processors, causes performance of operations comprising to:
receive, by a first network device, a particular data set addressed to a client device;
partition, by the first network device, the particular data set into at least a first subset of data and a second subset of data;
encapsulate, by the first network device, the first subset of data and the second subset of data each with a unique sequence number, wherein each unique sequence number is based at least in part on a first set of sequence numbers specified in an outer header of the particular data set prior to receipt by the first network device and a second set of sequence numbers specified in an inner header of the particular data set prior to receipt by the first network device;
encapsulate the first subset of data using a first header assigned by the first network device;
encapsulate the second subset of data using a second header assigned by the first network device, wherein the first header is different from the second header;
determine, based on the difference between the first header and the second header, that data with the first header is transmitted on a first physical link and data with the second header is transmitted on a second physical link different than the first physical link; and
transmit the first subset of data with the first header and the second subset of data with the second header.

2. The medium of claim 1, wherein:
the operations to transmit on the first physical link and to transmit on the second physical link are performed by a second network device different than the first network device; and
the second network device selects the first physical link for the first subset of data based on the corresponding first header and selects the second physical link for the second subset of data based on the corresponding second header.

3. The medium of claim 1, wherein the operations to transmit on the first physical link and to transmit on the second physical link are performed by the first network device.

4. The medium of claim 1, wherein a size of the first subset of data to be encapsulated with the first header and/or a size of the second subset of data to be encapsulated with the second header is based at least on a load expected on the first physical link and/or a load expected on the second physical link.

5. The medium of claim 1, wherein:
a source IP address for the first header is different than a source IP address for the second header; and
both the first IP address and the second IP address correspond to the first network device.

6. The medium of claim 1, wherein:
at least one value is different between a network tuple corresponding to the first subset of data and a network tuple corresponding to the second subset of data; and
the difference in the at least one value results in transmission of the first subset of data on the first physical link and the transmission of the second subset of data on the second physical link.

7. The medium of claim 1, wherein the particular data set addressed to the client device is associated with a single flow.

8. The medium of claim 1, wherein the particular data set addressed to the client device is associated with two or more flows.

9. A non-transitory computer readable medium comprising instructions which, when executed by one or more hardware processors, causes performance of operations comprising to:
receive, by a first network device, a particular data set addressed to a client device;
partition, by the first network device, the particular data set into a plurality of data sets;
encapsulate, by the first network device, each of the plurality of data sets with a unique sequence number, wherein each unique sequence number is based at least in part on a first set of sequence numbers specified in an outer header of the particular data set prior to receipt by the first network device and a second set of sequence numbers specified in an inner header of the particular data set prior to receipt by the first network device;

further encapsulate a first subset of data using a first header assigned by the first network device;

further encapsulate a second subset of data using a second header assigned by the first network device, wherein the first header is different from the second header;

determine, based on the difference between the first header and the second header, that data with the first header is transmitted on a first physical link and data with the second header is transmitted on a second physical link different than the first physical link;

transmit, by the first network device, the encapsulated plurality of data sets;

receive, by an access point, the encapsulated plurality of data sets using at least two physical links; and wirelessly transmit, by the access point to the client device, the encapsulated plurality of data sets in the order of the sequence numbers added by the first network device.

10. The medium of claim 9, wherein the inner header of the particular data set is in an encrypted form.

11. A non-transitory computer readable medium comprising instructions which, when executed by one or more hardware processors, causes performance of operations comprising to:

encapsulate a first subset of data and a second subset of data each with a unique sequence number, wherein each unique sequence number is based at least in part on a first set of sequence numbers specified in an outer header of a particular data set and a second set of sequence numbers specified in an inner header of the particular data set encapsulate the first subset of data using a first header assigned by a first network device;

encapsulate the second subset of data using a second header assigned by the first network device, wherein the first header is different from the second header;

determine, based on the difference between the first header and the second header, that data with the first header is transmitted on a first physical link and data with the second header is transmitted on a second physical link different than the first physical link;

receive, by an access point, a plurality of encapsulated data sets on a wired interface, wherein each of the plurality of encapsulated data sets comprises a sequence number;

order, by the access point, the plurality of encapsulated data sets according to the corresponding sequence number for each respective data set; and transmit, by the access point, the plurality of encapsulated data sets according to the order determined by the access point based on the corresponding sequence numbers.

12. A system comprising:
at least one device including a hardware processor;
the system configured to:
receive, by a first network device, a particular data set addressed to a client device;
partition, by the first network device, the particular data set into at least a first subset of data and a second subset of data;
encapsulate, by the first network device, the first subset of data and the second subset of data each with a unique sequence number, wherein each unique sequence number is based at least in part on a first set of sequence numbers specified in an outer header of the particular data set prior to receipt by the first network device and a second set of sequence numbers specified in an inner header of the particular data set prior to receipt by the first network device;

encapsulate the first subset of data using a first header assigned by the first network device;

encapsulate the second subset of data using a second header assigned by the first network device, wherein the first header is different from the second header;

determine, based on the difference between the first header and the second header, that data with the first header is transmitted on a first physical link and data with the second header is transmitted on a second physical link different than the first physical link; and transmit the first subset of data with the first header and the second subset of data with the second header.

13. The system of claim 12, wherein:
the operations of transmitting on the first physical link and transmitting on the second physical link are performed by a second network device different than the first network device; and
the second network device selects the first physical link for the first subset of data based on the corresponding first header and selects the second physical link for the second subset of data based on the corresponding second header.

14. The system of claim 12, wherein the operations of transmitting on the first physical link and transmitting on the second physical link are performed by the first network device.

15. The system of claim 12, wherein a size of the first subset of data to be encapsulated with the first header and/or a size of the second subset of data to be encapsulated with the second header is based at least on a load expected on the first physical link and/or a load expected on the second physical link.

16. The system of claim 12, wherein a source IP address for the first header is different than a source IP address for the second header, and wherein both the first IP address and the second IP address correspond to the first network device.

17. The system of claim 12, wherein:
at least one value is different between a network tuple corresponding to the first subset of data and a network tuple corresponding to the second subset of data; and
the difference in the at least one value results in transmission of the first subset of data on the first physical link and the transmission of the second subset of data on the second physical link.

18. The system of claim 12, wherein the particular data set addressed to the client device is associated with a single flow.

19. The system of claim 12, wherein the particular data set addressed to the client device is associated with two or more flows.

20. A system comprising:
at least one device including a hardware processor;
the system configured to:
receive, by a first network device, a particular data set addressed to a client device;
partition, by the first network device, the particular data set into a plurality of data sets;
encapsulate, by the first network device, each of the plurality of data sets with a unique sequence number, wherein each unique sequence number is based at least in part on a first set of sequence numbers specified in an outer header of the particular data set prior to receipt by the first network device and a second set of sequence numbers specified in an inner header of the particular data set prior to receipt by the first network device;

further encapsulate a first subset of data using a first header assigned by the first network device;

further encapsulate a second subset of data using a second header assigned by the first network device, wherein the first header is different from the second header;

determine, based on the difference between the first header and the second header, that data with the first header is transmitted on a first physical link and data with the second header is transmitted on a second physical link different than the first physical link;

transmit, by the first network device, the encapsulated plurality of data sets;

receive, by an access point, the encapsulated plurality of data sets using at least two physical links; and wirelessly transmit, by the access point to the client device, the encapsulated plurality of data sets in the order of the sequence numbers added by the first network device.

\* \* \* \* \*